US010232255B2

(12) United States Patent
Gassoway et al.

(10) Patent No.: US 10,232,255 B2
(45) Date of Patent: *Mar. 19, 2019

(54) PADDLE ACCESSORY FOR A GAME CONTROLLER

(71) Applicant: Microsoft Technology Licensing, LLC, Redmond, WA (US)

(72) Inventors: Gabriel Michael Rask Gassoway, Issaquah, WA (US); Aaron Schmitz, Redmond, WA (US); Jason Victor Tsai, Bellevue, WA (US); Christopher H. Kujawski, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 317 days.

This patent is subject to a terminal disclaimer.

(21) Appl. No.: 14/701,305

(22) Filed: Apr. 30, 2015

(65) Prior Publication Data

US 2016/0317919 A1 Nov. 3, 2016

(51) Int. Cl.
*A63F 13/00* (2014.01)
*A63F 13/24* (2014.01)
(Continued)

(52) U.S. Cl.
CPC ............. *A63F 13/24* (2014.09); *A63F 13/00* (2013.01); *A63F 13/245* (2014.09); *A63F 13/98* (2014.09)

(58) Field of Classification Search
CPC .......... A63F 13/00; A63F 13/02; A63F 13/24; A63F 13/245
(Continued)

(56) References Cited

U.S. PATENT DOCUMENTS

| 2,616,698 A | 11/1952 | Singer |
| 6,659,870 B2 | 12/2003 | Sobota |

(Continued)

FOREIGN PATENT DOCUMENTS

| CA | 2913093 A1 | 11/2014 |
| EP | 1380924 A1 | 1/2004 |

(Continued)

OTHER PUBLICATIONS

"The Razer Sabertooth gaming controller for the Xbox 360/PC," YouTube Website, Available Online at https://www.youtube.com/watch?feature=player_embedded&v=aaRDcV1Ryr8, Jun. 10, 2013, 5 pages.

(Continued)

*Primary Examiner* — William H McCulloch, Jr.
*Assistant Examiner* — Chase Leichliter
(74) *Attorney, Agent, or Firm* — Alleman Hall Creasman & Tuttle LLP

(57) ABSTRACT

A paddle accessory includes a blade, a sensor-activation feature extending from the blade, and a mounting interface spaced apart from the sensor-activation feature. The blade is sized and shaped for manual manipulation by a finger. The mounting interface is configured to selectively mate with a pivot of a game controller to removably affix the paddle accessory to the game controller. The paddle accessory is configured to rotate relative to the pivot to translate a touch force applied to the blade into an actuation force applied by the sensor-activation feature to a paddle-actuatable sensor interior an aperture of the game controller.

20 Claims, 11 Drawing Sheets

(51) Int. Cl.
*A63F 13/245* (2014.01)
*A63F 13/98* (2014.01)

(58) Field of Classification Search
USPC .............................................. 463/36–38, 47
See application file for complete search history.

(56) References Cited

U.S. PATENT DOCUMENTS

| | | | |
|---|---|---|---|
| 7,026,564 | B1 | 4/2006 | Savicki et al. |
| 7,177,724 | B2 | 2/2007 | Cantello et al. |
| 7,458,716 | B2 | 12/2008 | Kato |
| 7,533,884 | B1 | 5/2009 | Padget |
| 7,976,385 | B2 | 7/2011 | Riggs et al. |
| 7,982,149 | B2 | 7/2011 | Larsen et al. |
| 8,366,547 | B2 | 2/2013 | Haswell et al. |
| 8,480,491 | B2 | 7/2013 | Burgess et al. |
| 8,523,684 | B2 | 9/2013 | Lutnick et al. |
| 8,641,525 | B2 | 2/2014 | Burgess et al. |
| 8,932,135 | B2 | 1/2015 | Coe |
| 9,089,770 | B2 | 7/2015 | Burgess et al. |
| 9,308,450 | B2 | 4/2016 | Burgess et al. |
| 9,308,451 | B2 | 4/2016 | Burgess et al. |
| 9,352,229 | B2 | 5/2016 | Burgess et al. |
| 9,492,744 | B2 | 11/2016 | Burgess et al. |
| 9,533,219 | B2 | 1/2017 | Burgess et al. |
| 9,550,116 | B2 | 1/2017 | Burgess et al. |
| 9,707,479 | B2 | 7/2017 | Burgess et al. |
| 9,878,238 | B2 | 1/2018 | Burgess et al. |
| 2002/0052237 | A1 | 5/2002 | Magill |
| 2002/0128064 | A1 | 9/2002 | Sobota |
| 2006/0040740 | A1 | 2/2006 | DiDato |
| 2009/0218160 | A1 | 9/2009 | Baluch et al. |
| 2010/0279773 | A1 | 11/2010 | Atzmon |
| 2010/0298053 | A1 | 11/2010 | Kotkin |
| 2011/0011712 | A1 | 1/2011 | Klinghult |
| 2012/0244944 | A1* | 9/2012 | Kotkin .................... A63F 13/98 463/38 |
| 2013/0095925 | A1* | 4/2013 | Xu ........................ G06F 1/1626 463/37 |
| 2013/0267321 | A1 | 10/2013 | Burgess et al. |
| 2014/0113723 | A1 | 4/2014 | Burgess et al. |
| 2014/0121913 | A1 | 5/2014 | Sata |
| 2015/0072790 | A1* | 3/2015 | Kotkin .................. A63F 13/245 463/38 |
| 2015/0238855 | A1* | 8/2015 | Uy ........................ G06F 3/0338 463/37 |
| 2015/0297993 | A1 | 10/2015 | Burgess et al. |
| 2015/0297994 | A1 | 10/2015 | Burgess et al. |
| 2015/0321092 | A1 | 11/2015 | Burgess et al. |
| 2015/0321093 | A1 | 11/2015 | Burgess et al. |
| 2015/0360126 | A1* | 12/2015 | Burgess .................. A63F 13/24 463/37 |
| 2016/0082349 | A1* | 3/2016 | Burgess .................. A63F 13/24 463/37 |
| 2016/0193529 | A1 | 7/2016 | Burgess et al. |
| 2016/0228765 | A1* | 8/2016 | Rubio ..................... A63F 13/24 |
| 2016/0296837 | A1 | 10/2016 | Burgess et al. |
| 2016/0310841 | A1* | 10/2016 | Offerdahl, III ......... A63F 13/24 |
| 2016/0346682 | A1* | 12/2016 | Burgess .................. A63F 13/24 |
| 2017/0001108 | A1 | 1/2017 | Burgess et al. |
| 2017/0157509 | A1 | 6/2017 | Burgess et al. |

FOREIGN PATENT DOCUMENTS

| | | | |
|---|---|---|---|
| EP | 3053635 | A1 | 8/2016 |
| FR | 3016226 | A1 | 7/2015 |
| FR | 3020762 | A1 | 11/2015 |
| FR | 3032355 | A1 | 8/2016 |
| FR | 3032355 | B1 | 2/2017 |
| WO | 2014051515 | A1 | 4/2014 |
| WO | 2014187923 | A1 | 11/2014 |
| WO | WO 2014187923 | A1 * | 11/2014 ............. A63F 13/02 |

OTHER PUBLICATIONS

ISA European Patent Office, International Search Report and Written Opinion Issued in PCT Application No. PCT/US2016/026302, dated Jul. 26, 2016, WIPO, 12 pages.
"ScufGaming", Published on: Jun. 25, 2014 Available at: http://scufgaming.com/controllers/scuf-one-xbox-one/features/.
"Razer Sabertooth—Gaming Controller for Xbox", Published on: Jan. 4, 2013 Available at: http://www.razerzone.com/gaming-controllers/razer-sabertooth.
"Haptic Paddles", Retrieved on: Feb. 2, 2015, Available at: http://eduhaptics.org/index.php/HapticDevices/HapticPaddles.
IPEA European Patent Office, International Preliminary Report on Patentability Issued in PCT Application No. PCT/US2016/026302, dated Jul. 17, 2017, WIPO, 7 Pages.
IPEA European Patent Office, Second Written Opinion Issued in PCT Application No. PCT/US2016/026302, dated Jan. 18, 2017, WIPO, 6 Pages.
"Final Office Action Issued in U.S. Appl. No. 14/701,003", dated Dec. 7, 2017, 8 Pages.
"Non Final Office Action Issued in U.S. Appl. No. 14/701,003", dated May 19, 2017, 13 Pages.
"Notice of Allowance Issued in U.S. Appl. No. 14/701,003", dated Mar. 1, 2018, 8 Pages.
"International Search Report and Written Opinion Issued in PCT Application No. PCT/US2016/026297", dated Jun. 1, 2016, 11 Pages.
"International Preliminary Report on Patentability Issued in PCT Application No. PCT/US2016/026297", dated Dec. 12, 2016, 6 Pages.
"Aim Controllers PS4", Retrieved from https://twitter.com/aimcontrollerss?lang=en, Sep. 2, 2014., 2 Pages.
"Official Controller Discussion", Retrieved from https://web.archive.org/web/20160518033323/http://fps247.com/threads/official-controller-discussion.94509/, Dec. 26, 2014, 16 Pages.
"Notice of Allowance Issued in European Patent Application No. 16716444.1", dated Dec. 13, 2018, 5 Pages.

* cited by examiner

PADDLE ACCESSORY FOR A GAME CONTROLLER

BACKGROUND

A user input control device, such as a game controller may be used to provide user input to control an object or a character in a video game or to provide some other form of control. A game controller may include various types of controls that may be configured to be manipulated by a finger to provide different types of user input. Non-limiting examples of such controls may include push buttons, triggers, touch pads, joysticks, paddles, bumpers, and directional pads. The various controls may be manipulated to provide control signals that may be mapped to different operations in a video game.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A paddle accessory includes a blade, a sensor-activation feature extending from the blade, and a mounting interface spaced apart from the sensor-activation feature. The blade is sized and shaped for manual manipulation by a finger. The mounting interface is configured to selectively mate with a pivot of a game controller to removably affix the paddle accessory to the game controller. The paddle accessory is configured to rotate relative to the pivot to translate a touch force applied to the blade into an actuation force applied by the sensor-activation feature to a paddle-actuatable sensor interior an aperture of the game controller.

DETAILED DESCRIPTION

Figure 1:
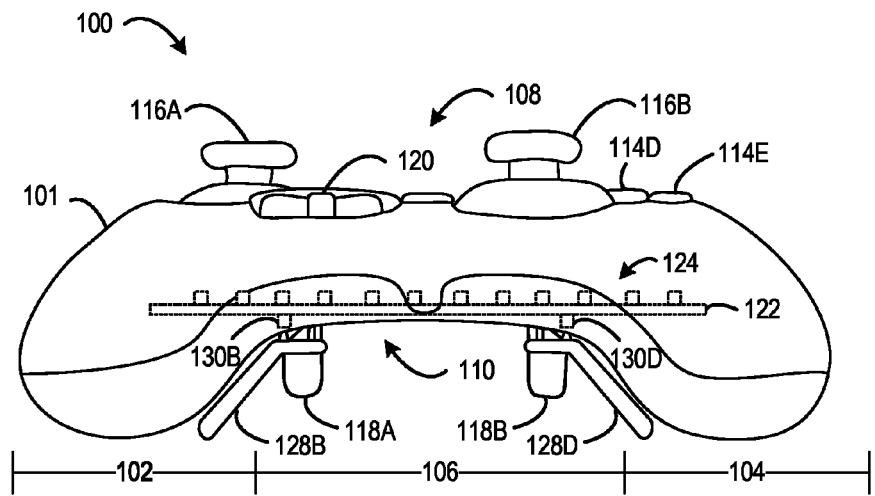
FIG. 1 shows a bottom of a game controller with a plurality of paddle accessories affixed to the game controller.

Some game controllers include a plurality of controls (e.g., joystick, directional pad, action buttons) located on a thumb-side of the game controller. These controls may be configured to be manually manipulated by thumbs of a user gripping the game controller with two hands. In such a configuration, during the course of gameplay, a scenario may occur where a user desires to manipulate multiple controls with the same thumb. For example, a user may want to press an action button while at the same time manipulating a joystick. In this scenario, the user may be forced to take his thumb off the joystick in order to press the action button, and the joystick may move away from a desired manipulation posture, thus reducing control accuracy.

Furthermore, some game controllers may include a plurality of controls located on a finger-side of the game controller that opposes the thumb-side of the game controller. The plurality of controls located on the finger-side may be configured to be manipulated by fingers other than thumbs (e.g., middle fingers, ring fingers, pinky fingers) of a user gripping the game controller with two hands. In some cases, the plurality of controls located on the finger-side and some of the action buttons located on the thumb-side may be actuated to generate control signals that are mapped to the same game operations. Such a configuration can alleviate the scenario where the user has to remove their thumb from the joystick to press an action button, for example. Instead, the user can press a corresponding control on the finger-side of the game controller using a finger other than the thumb, so that the thumb can remain on the joystick.

Typically, such game controllers are shaped/sized to fit an average hand size of a population of users. Likewise, the controls located on the finger-side that are integral to the game controller may be designed according to a "one size fits all" approach. However, users may have preferences on the shape, size, position and texture of such controls that differ from the standard controls that are integral to the game controller. Moreover, some users may prefer to manipulate controls on just the thumb-side of the game controller without having controls located on the finger-side of the game controller.

Accordingly, the present disclosure relates to paddle accessories configured to be removably affixable to a game controller without the use of tools. Furthermore, the present disclosure relates to a game controller including a plurality of pivots configured to removably affix a selected number of paddle accessories to the game controller. Each pivot may be configured to translate a touch applied to a corresponding paddle accessory to an actuation of a paddle-actuatable sensor.

Such a game controller may enable a different number (e.g., 0, 2, 4) of paddle accessories to be removably affixed to the game controller. Moreover, the game controller may enable differently configured paddle accessories to be quickly and easily swapped on the game controller without the use of tools. For example, such a configuration may facilitate the use of differently configured paddle accessories (e.g., having a different size or different orientation) by different users.

FIGS. 1-4 show an example user input control device in the form of a game controller 100. The game controller 100 may be configured to translate user input into control signals that are provided to a computing device, such as a gaming console. The control signals may be mapped to commands to control a video game or perform other operations. For example, the game controller 100 may be configured to send control signals via a wired or wireless connection with a computing device.

The game controller 100 includes a grip 101 configured to be held with two hands. As such, the grip 101 includes a left-hand portion 102 configured to be gripped by a left hand and a right-hand portion 104 configured to be gripped by a right hand. The right-hand portion 104 may oppose the left-hand portion 102. Further, a central portion 106 may be positioned intermediate the left-hand portion 102 and the right-hand portion 104.

When a user holds the controller with two hands such that the left hand grips the left-hand portion 102 and the right hand grips the right-hand portion 104, the user's thumbs may naturally interface with a thumb-side 108 of the grip 101. Further, the user's fingers other than the thumb (e.g., at least a ring finger and a pinky finger) may interface with a finger-side 110 of the grip 101.

The game controller 100 includes a plurality of controls 112 configured to generate different control signals responsive to finger manipulation. The plurality of controls 112 may be integral to the game controller 100 such that the controls cannot be removed without dismantling the game controller 100. Although in some implementations, one or more of the plurality of controls 112 may be removably affixable to the game controller 100.

In the depicted implementation, the plurality of controls 112 includes a plurality of action buttons 114 (e.g., 114A, 114B, 114C, 114D, 114E, 114F, 114G, 114H, and 114I), a plurality of joysticks 116 (e.g., a left joystick 116A and a right joystick 116B), a plurality of triggers 118 (e.g., a left trigger 118A and a right trigger 118B), and a directional pad 120. A majority of the controls are positioned on the thumb-side 108 of the game controller 100 (e.g., the plurality of triggers 118 are positioned intermediate the thumb-side 108 and the finger-side 110). As such, the plurality of controls 112 typically may be manipulated by a user's thumbs. Although, in some cases, a user may manipulate one or more of the plurality of controls 112 with an index finger. The game controller 100 may include any suitable number of controls. The game controller 100 may include any suitable type of controls.

A printed circuit board 122 may be located in an interior cavity 200 (shown in FIG. 5) of the grip 101. The printed circuit board 122 may include a plurality of electronic input sensors 124. The plurality of electronic input sensors 124 may correspond to the plurality of controls 112. In particular, each electronic input sensor may be configured to generate a control signal responsive to interaction with a corresponding control.

For example, each of the plurality of action buttons 114 may be configured to activate a corresponding electronic input sensor to generate a control signal responsive to being depressed (e.g., via finger manipulation). In another example, each of the plurality of joysticks 116 may interact with electronic input sensors in the form of potentiometers that use continuous electrical activity to provide an analog input control signal based on a position of the joystick in relation to a default "center" position. In another example, each of the triggers 118 may be configured to interact with an electronic input sensor to provide a variable control signal based on a position of the trigger relative to a default position. For example, as a trigger is pulled farther away from the default position, a characteristic of the generated control signal may increase in magnitude. In another example, the directional pad 120 may be configured to activate different electronic input sensors corresponding to different directions (e.g., up, down, left, right) responsive to the directional pad being depressed in the different directions.

Non-limiting examples of electronic input sensors may include dome switches, tactile switches, potentiometers, Hall Effect sensors, and other electronic sensing components. The game controller 100 may include any suitable number of electronic input sensors. The game controller 100 may include any suitable type of electronic input sensors.

The game controller 100 includes a plurality of pivots 126 (e.g., 126A, 126B, 126C, 126D of FIG. 3) accessible on the finger-side 110 of the grip 101. The plurality of pivots 126 may be configured to removably affix a plurality of paddle accessories 128 (e.g., 128A, 128B, 128C, 128D) to the game controller 100. In particular, each pivot 126 may be configured to selectively mate with a mounting interface 202 (shown in FIG. 5) of a selected paddle accessory 128 to removably affix the selected paddle accessory 128 to the game controller 100.

In the depicted implementation, the plurality of pivots 126 are located in the interior cavity 200 of the grip 101. A plurality of pivot rims 130 (e.g., 130A, 130B, 130C, 130D of FIG. 3) located on the grip 101 form a plurality of pivot apertures 132 (e.g., 132A, 132B, 132C, 132D) through which the plurality of pivots 126 are accessible to interface with selected paddle accessories. In particular, a selected paddle accessory 128 may be inserted into a selected pivot aperture 132 to interface with a selected pivot 126 to removably affix the selected paddle accessory 128 to the game controller 100.

The plurality of pivots 126 may be recessed from the plurality of pivot apertures 133. Moreover, each pivot aperture 132 may be sized to prevent admittance of a finger through the pivot aperture 132. In other words, the pivot aperture 132 can be sized such that a finger cannot pass through the aperture into the interior cavity 200 of the grip 101. Accordingly, when a paddle accessory is not removably affixed to a selected pivot, the selected pivot 126 does not interfere with fingers of a user holding the game controller 100.

The game controller 100 includes a plurality of paddle-actuatable sensors 134 (e.g., 134A, 134B, 134C, 134D of FIG. 3) located on the printed circuit board 122. A plurality of sensor rims 136 (e.g., 136A, 136D, 136D of FIG. 3) may be located on the grip 101 and spaced apart from the plurality of pivot rims 130. The plurality of sensor rims 136 may form a plurality of sensor apertures 138 (e.g., 138A, 138B, 138C, 138D of FIG. 3) through which the plurality of paddle-actuatable sensors 134 are accessible to interface with selected paddle accessories. In particular, when a selected paddle accessory 128 is removably affixed to a selected pivot 126, a touch force applied to the selected paddle accessory 128 outside the apertures of the game controller 100 (e.g., the plurality of pivot apertures 132 and the plurality of sensor apertures 138) may be translated to an actuation force applied by the selected paddle accessory 128 to a corresponding paddle-actuatable sensor 134. The plurality of paddle accessories 128 each may include a sensor activation feature 140 (e.g., 140A, 140B, 140C, 140D of FIG. 2) configured to interface with a corresponding paddle-actuatable sensor 134 to apply the actuation force when the selected paddle accessory 128 rotates responsive to the touch force.

The plurality of paddle-actuatable sensors 134 may be recessed from the plurality of sensor apertures 138. Moreover, each sensor aperture 138 may be sized to prevent admittance of a finger through the sensor aperture 138. In other words, the sensor aperture 138 can be sized such that a finger cannot pass through the sensor aperture 138 into the interior cavity 200 of the grip 101. Accordingly, paddle-actuatable sensors 134 within the interior cavity 200 of the grip 101 are less likely to be accidentally activated by user fingers, because the small aperture size blocks the user fingers from engaging the paddle-actuatable sensors 134.

In the depicted implementation, the plurality of pivots 126 and the plurality of paddle-actuatable sensors 134 are arranged such that each paddle-actuatable sensor 134 is positioned closer to a hand portion than a corresponding pivot 126. For example, the paddle-actuatable sensors 134A and 134B may be positioned closer to the left-hand portion 102 than the pivots 126A and 126B. Likewise, the paddle-actuatable sensors 134C and 134D may be positioned closer to the right-hand portion 104 than the pivots 126C and 126D. Such an arrangement may cause a paddle accessory 128 that is removably affixed to a pivot 126 to extend laterally from the pivot 126 toward a hand portion (e.g., the left-hand portion 102 or the right-hand portion 104).

By positioning the paddle accessories 128 laterally along the finger-side 110 of the game controller 100, the paddle accessories 128 may extend towards the fingers of a user that is gripping the game controller 100. Accordingly, different paddle accessories 128 having different lengths may be swapped out to accommodate different hand sizes of different users. For example, longer paddle accessories may be removably affixed to the game controller 100 for a user having smaller hands and fingers that cannot reach as far. In another example, shorter paddle accessories may be removably affixed to the game controller 100 for a user having larger hands and fingers that can reach farther.

In the depicted implementation, anywhere from 0-4 paddle accessories may be removably affixed to the game controller 100. The game controller 100 may include any suitable number of pivot and paddle-actuatable sensor pairs in order to accommodate any suitable number of paddle accessories. Moreover, a pivot and paddle-actuatable sensor pair may be located on any suitable portion of the game controller 100. For example, in some implementations, a pivot and paddle-actuatable sensor pair may be positioned on the thumb-side 108 of the game controller 100 to removably affix a selected paddle accessory 128.

In some implementations, each of the plurality of pivots 126 may be identically configured. Moreover, each pivot and paddle-actuatable sensor pair may be identically configured. Such a configuration may allow for a same paddle accessory 128 to be removably affixable to any of the plurality of pivots 126. In this way, the same paddle accessory can be used at two or more different locations. Furthermore, the location of the paddle accessory can be easily changed without the use of tools.

In some implementations, the paddle-actuatable sensors 134 may include Hall Effect sensors that need not be physically contacted by a paddle accessory 128 in order to be activated. Rather, in such implementations, the selected paddle accessory 128 inside of the sensor aperture 138 moves into an actuation range of the Hall Effect sensor responsive to a touch applied to the selected paddle accessory 128 outside of the sensor aperture 138. For example, the sensor activation feature 140 may include a magnet (or another material that affects a magnetic field produced by the Hall Effect sensor). Further, the pivot 126 may be configured to allow the paddle accessory 128 to rotate responsive to a touch being applied to the selected paddle accessory 128 to move the sensor-activation feature 140 towards the Hall Effect sensor in order to influence the magnetic field produced by the Hall Effect sensor such that an output signal produced by the Hall Effect sensor is affected. In other words, the sensor activation feature 140 may cause the Hall Effect sensor to produce an activation signal without physically contacting the sensor. In another example, the sensor-activation feature of the selected paddle accessory 128 moves away from the Hall Effect sensor responsive to a touch being applied to the selected paddle accessory outside of the sensor aperture 138 to influence the magnetic field produced by the Hall Effect sensor such that the Hall Effect sensor produces an activation signal.

Figure 2:
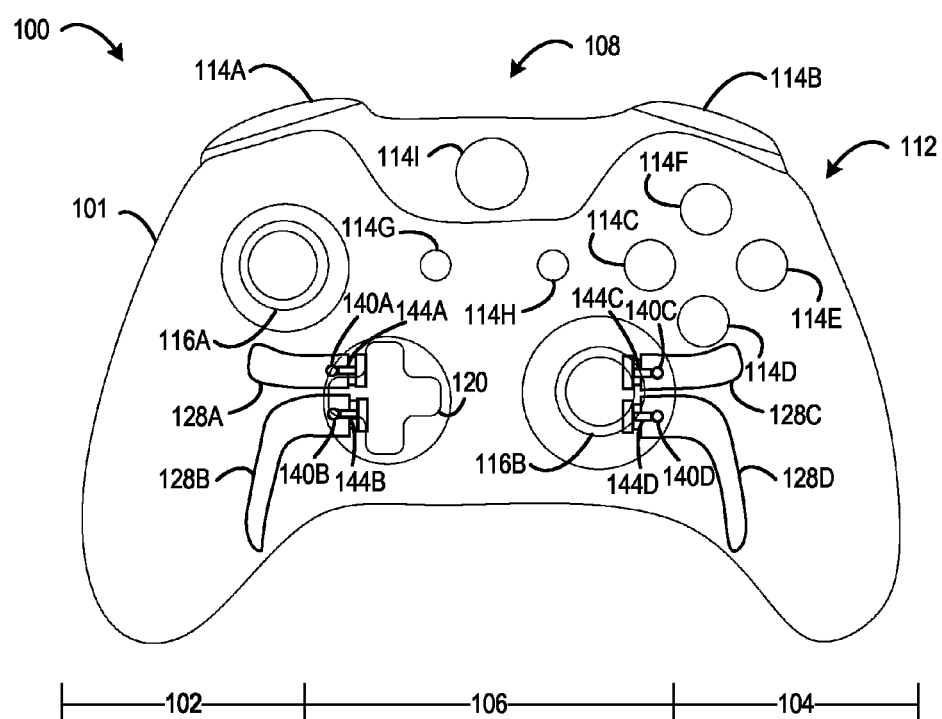
FIG. 2 shows a front of the game controller of FIG. 1 with the plurality of paddle accessories affixed to the game controller.
Figure 3:
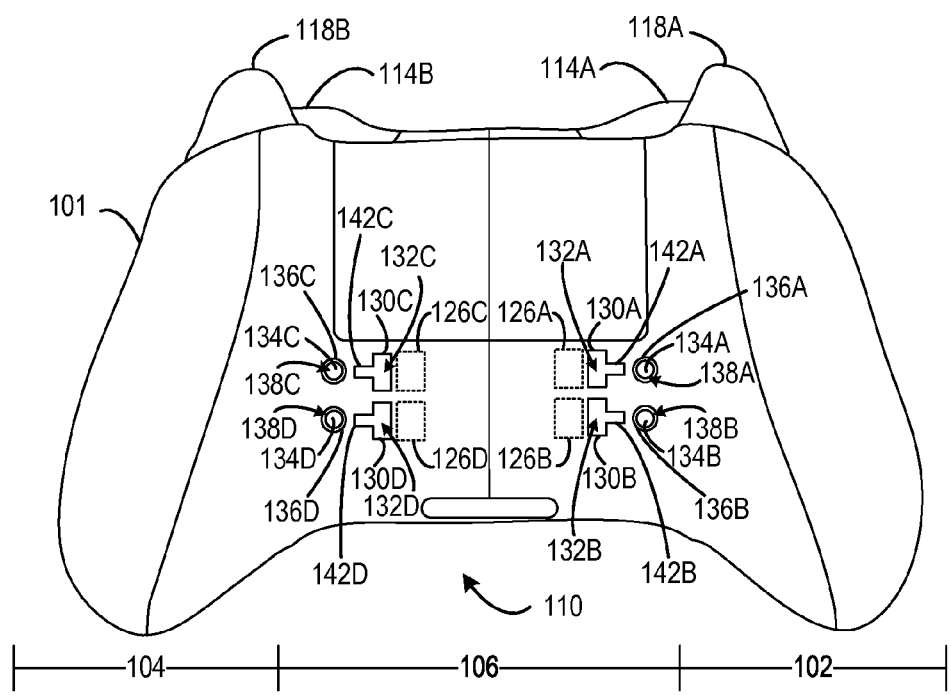
FIG. 3 shows a back of the game controller of FIG. 1 without the plurality of paddle accessories affixed to the game controller.
Figure 4:
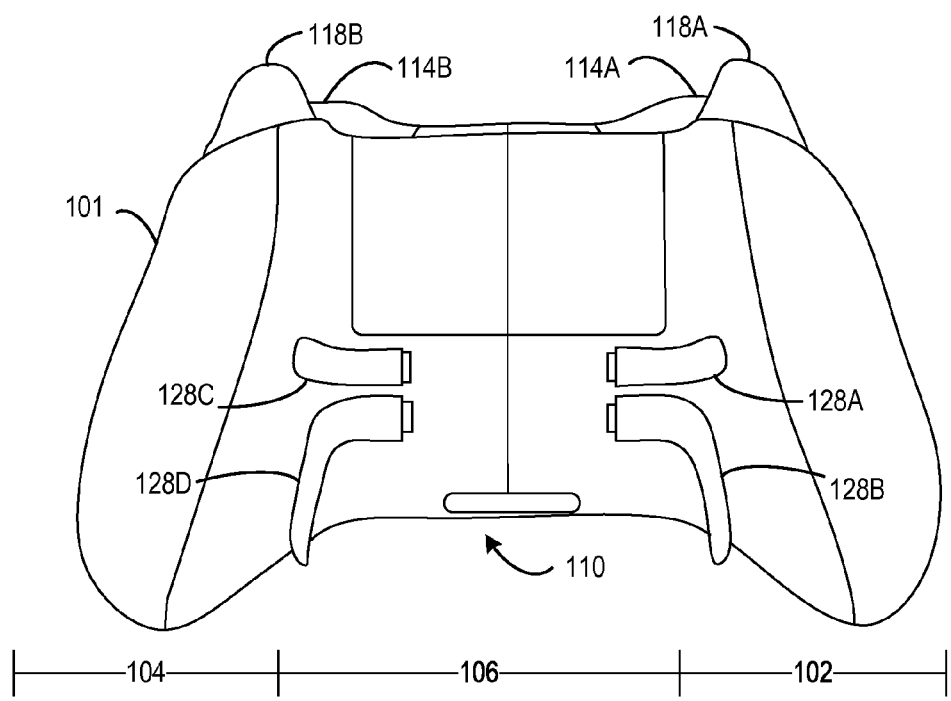
FIG. 4 shows a back of the game controller of FIG. 1 with the plurality of paddle accessories affixed to the game controller.

In some implementations, the plurality of pivot rims 130 may define a plurality of mating slots 142 (e.g., 142A, 142B, 142C, 142D of FIG. 2). Each mating slot may be configured to receive a stabilization fin 144 (e.g., 144A, 144B, 144C, 144D) of a selected paddle accessory 128 that is removably affixed to a corresponding pivot 126. In particular, the selected paddle accessory 128 may rotate relative to the corresponding pivot 126 along a first axis responsive to a touch force being applied to the selected paddle accessory 128. The mating slot 142 may be sized to prevent the stabilization fin 144 from rotating about an axis different than the first axis during rotation of the selected paddle accessory 128. For example, the mating slot 142 may have a width that is slightly greater than a width of the stabilization fin 144. In this way, the interaction of the stabilization fin 144 with the mating slot 142 may effectively prevent the selected paddle accessory 128 from twisting when being depressed.

Furthermore, the stabilization fin 144 of the selected paddle accessory 128 may be sized to extend into the corresponding mating slot 142 even when the selected paddle accessory 128 is in a default posture where no touch force is applied to rotate the selected paddle accessory 128. Further, when the selected paddle accessory 128 rotates responsive to a touch force, the stabilization fin 144 may move further into the mating slot 142 relative to when the selected paddle accessory 128 is in the default posture. In other words, the stabilization fin 144 may move from a first depth in the mating slot 142 to a second depth in the mating slot 142 that is greater than the first depth responsive to the touch force being applied to the selected paddle accessory 128.

Figure 5:
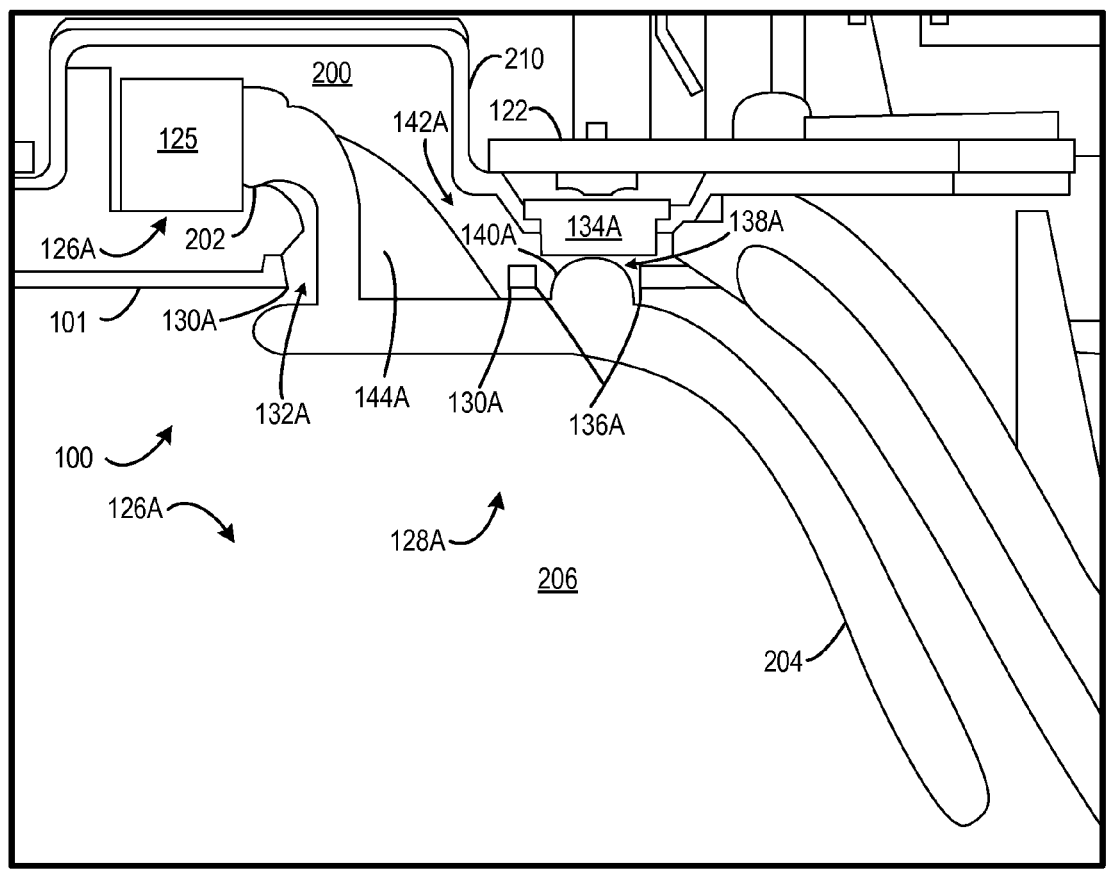
FIG. 5 shows a sectional view of an example paddle accessory affixed to the game controller of FIG. 1.

The pivot 126 may include any suitable structure configured to removably affix a selected paddle accessory 128 to the game controller 100. FIG. 5 shows an example pivot 126A including a magnet 125 configured to magnetically affix the paddle accessory 128A to the game controller 100. Such an implementation may be referred to herein as a magnetic pivot. In particular, the paddle accessory 128A may include a mounting interface 202 made at least partially of ferromagnetic material to magnetically affix the paddle accessory 128A to the pivot 126A of the game controller 100. In some implementations, the paddle accessory 128 may be a single metal ferromagnetic part. For example, the ferromagnetic part may be injection-molded metal. In another example, the ferromagnetic part may be machined from a single piece of metal. In other implementations, the paddle accessory 128 may be an assembly of different pieces (e.g., mounting interface and blade).

The magnet 125 may be located in the interior cavity 200 of the game controller 100 as defined by the grip 101. For example, the magnet 125 may be coupled to the grip 101 via pressure-sensitive adhesive. To affix the paddle accessory 128A to the magnet 125, the paddle accessory 128A may be inserted through the pivot aperture 132A defined by the pivot rim 130A. Moreover, the stabilization fin 144A may be inserted into the mating slot 142A. An example approach for manipulating the paddle accessory 128A to affix the paddle accessory 128A to the magnet 125 is shown in FIGS. 7-9 and is discussed in more detail below.

When the mounting interface 202 is magnetically affixed to the magnet 125, the paddle accessory 128A may be positioned such that the sensor-activation feature 140A extends into the sensor aperture 138A to interface with the paddle-actuatable sensor 134A. In the illustrated example, the sensor-activation feature 140A includes a projection, and the paddle-actuatable sensor 134A includes a tactile switch. In particular, the sensor-activation feature 140A may extend from a blade 204 of the paddle accessory 128 such that the sensor-activation feature 140A is spaced apart from the mounting interface 202. Such a configuration enables the paddle accessory 128A to translate a touch force applied to the blade 204 at an exterior 206 of the game controller 100 into an actuation force applied by the sensor-activation feature 140A to the paddle-actuatable sensor 134A in the interior cavity 200. In this way, a touch force applied outside of the pivot aperture 132A and the sensor aperture 138A actuates the paddle-actuatable sensor 134A. For example, the paddle accessory 128A may rotate relative to the pivot 126A responsive to the touch force being applied to the blade 204, such that the sensor-activation feature 140A moves towards the paddle-actuatable sensor 134A and applies a suitable amount of pressure to actuate the paddle-actuatable sensor 134A.

Figure 6:
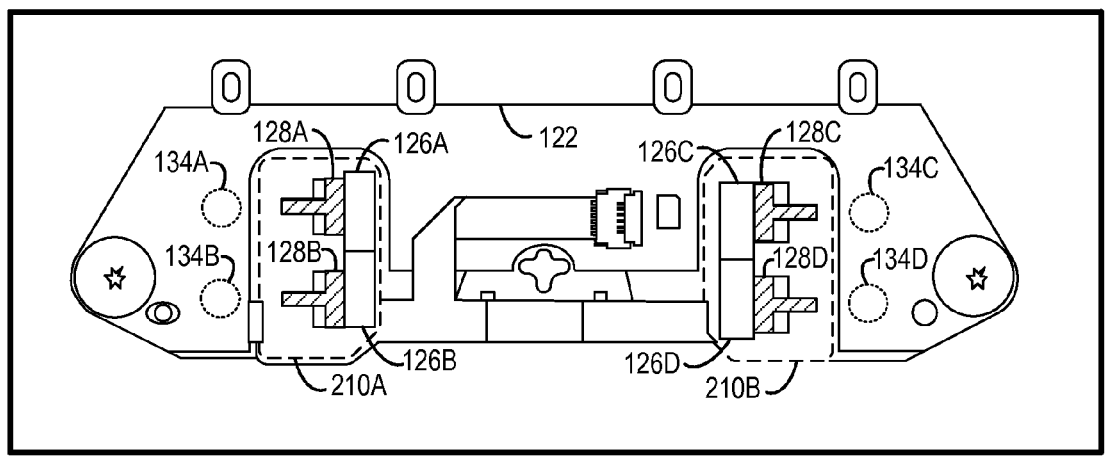
FIG. 6 shows a top view of a printed circuit board of the game controller of FIG. 1 when the plurality of paddle accessories are affixed to the game controller.

In some implementations, the game controller 100 may include one or more electrostatic discharge shields 210 (e.g., 210A, 210B of FIG. 6) to electrically insulate internal electronic components (e.g., electronic components located on the printed circuit board 122 of the game controller 100) from the magnets 126 and other sources of electrical interference. FIG. 6 shows a top view of the printed circuit board 122 with the electrostatic discharge shields 210A and 210B drawn in dashed lines to reveal the plurality of paddle accessories 128 magnetically affixed to the plurality of pivots 126. The plurality of paddle-actuatable sensors 134 are positioned on an underside of the printed circuit board 122 so that the plurality of paddle-actuatable sensors 134 may be accessible to the plurality of paddle accessories 128.

Figure 7:
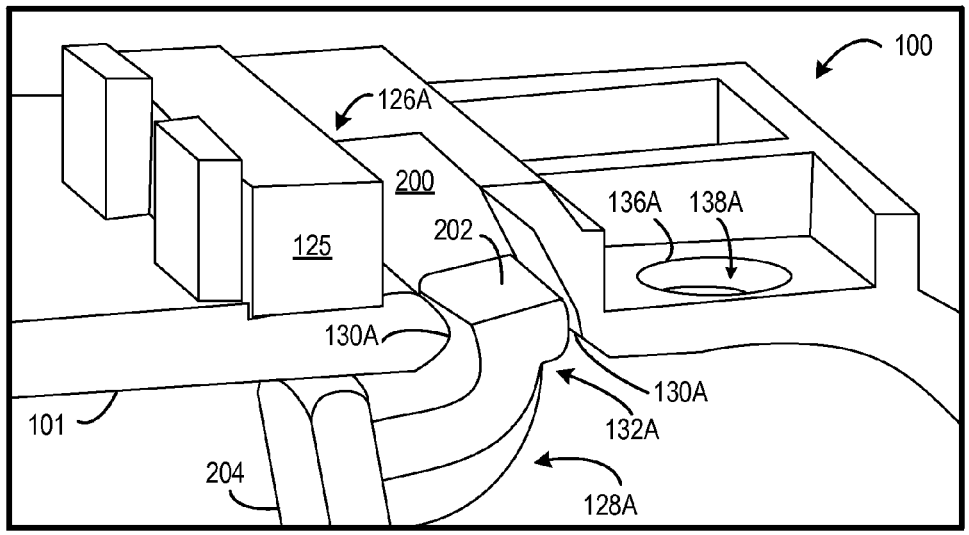
FIG. 7-9 show an example approach for removably affixing the paddle accessory of FIG. 5 to a pivot including a magnet.
Figure 8:
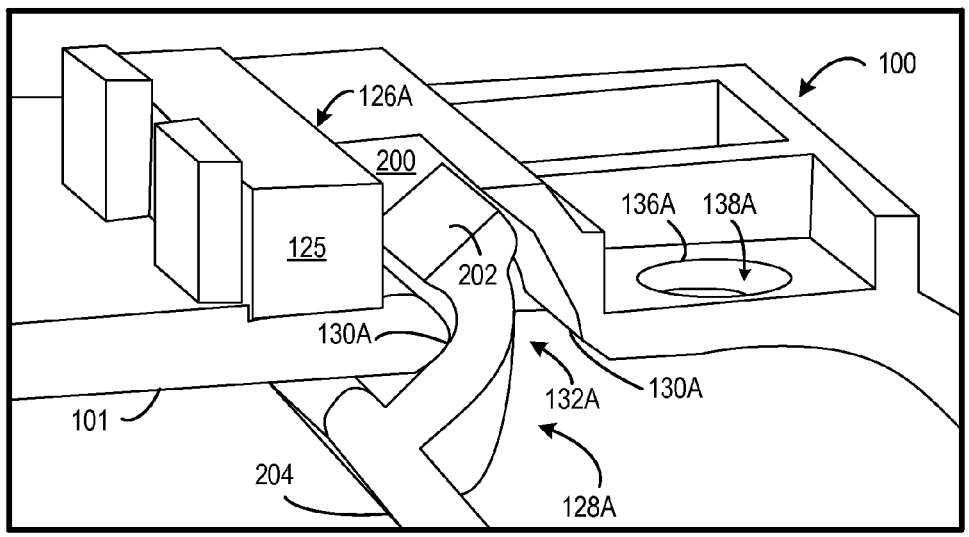
Figure 9:
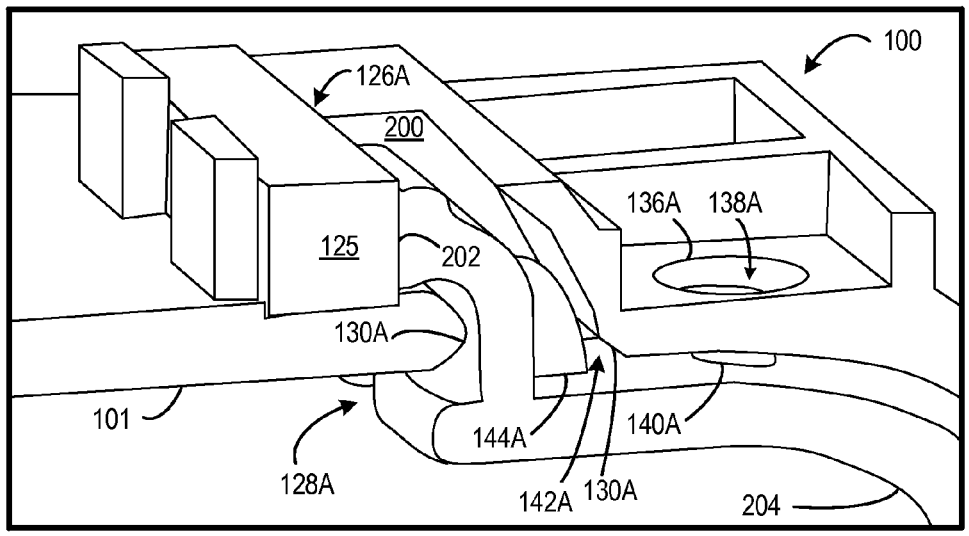

FIG. 7-9 show an example approach for removably affixing the paddle accessory 128A to the pivot 126A that includes the magnet. In FIG. 7, the paddle accessory 128A is oriented in a first position to allow the mounting interface 202 to be inserted into the pivot aperture 132A. In the first position, the blade 204 is askew relative to the grip such that the blade 204 is almost perpendicular to the grip 101.

In FIG. 8, the paddle accessory 128A has been inserted through the pivot aperture 132A far enough into the interior cavity 200 for the mounting interface 202 to clear the pivot 130A rim. Once the mounting interface 202 has cleared the aperture rim 130A, the paddle accessory 128A may be rotated (e.g., approximately ninety degrees) from the first position to a second position where the mounting interface 202 mates with the pivot 126A to magnetically affix the paddle accessory 128A to the game controller 100.

In FIG. 9, the paddle accessory 128A is oriented in the second position with the blade 204 being aligned to follow the contour of the grip 101 (e.g., extending substantially parallel with the grip 101). In the second position, the stabilization fin 144A is inserted in the mating slot 142A defined by the pivot rim 130A and extends into the interior cavity 200. Further, the sensor-activation feature 140A extends into the sensor aperture 138A to interface with the paddle-actuatable sensor 134A (not shown in FIGS. 7-9 for purposes of visual clarity). Note that the same approach may be performed in reverse order to remove the paddle accessory 128A from the game controller 100.

Figure 10:
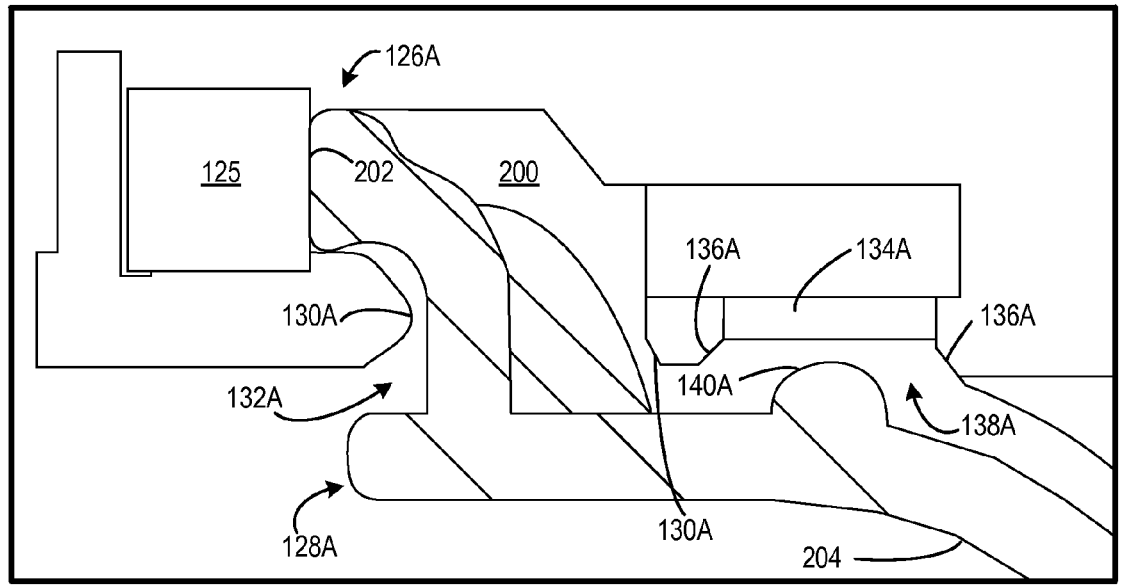
FIGS. 10-11 shows the paddle accessory of FIG. 5 rotating to apply an actuation force to a paddle-actuatable sensor responsive to a touch force being applied to the paddle accessory.
Figure 11:
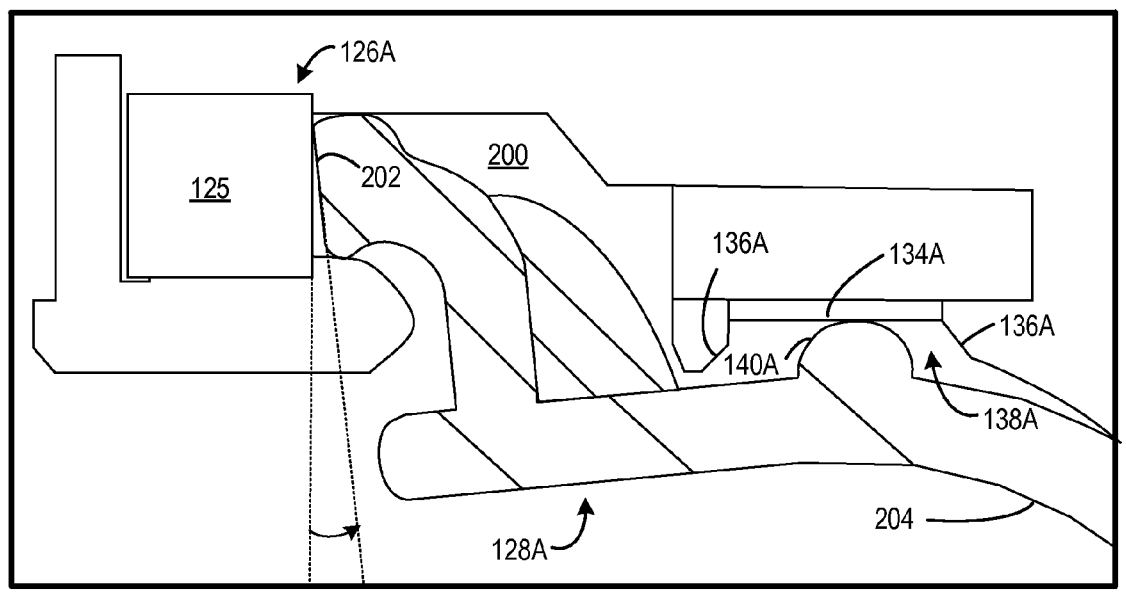

FIGS. 10-11 show the paddle accessory 128A rotating to apply an actuation force to the paddle-actuatable sensor 134A responsive to a touch force being applied to the paddle accessory 128A. In FIG. 10, the paddle accessory 128A is in a default posture in which no touch force is applied to the blade 204. In the default posture, the mounting interface 202 aligns vertically with the pivot 126A such that the mounting interface 202 is flush with the pivot 126A. Further, in the default posture, the sensor-activation feature 140A extends into the interior cavity 200, but the sensor-activation feature 140A is spaced apart from the paddle-actuatable sensor 134A. In some implementations, the sensor-activation feature 140A may touch the paddle-actuatable sensor 134A, but without applying enough force to cause the paddle-actuatable sensor 134A to actuate. The magnetic attraction between the pivot 126A and the mounting interface 202 may maintain the paddle accessory in the default posture when no touch force is applied to the paddle accessory 128A.

In FIG. 11, the paddle accessory 128A is rotated to an actuation posture responsive to a touch input force being applied to the blade 204. In the actuation posture, the mounting interface 202 rotates relative to the pivot 126A such that the mounting interface 202 is not flush with the pivot 126A. In one configuration, in the actuation posture, the sensor-activation feature 140A extends further into the interior cavity 200 relative to the default posture. In the actuation posture, the sensor-activation feature 140A presses the paddle-actuatable sensor 134A with an actuation force sufficient to actuate the paddle-actuatable sensor 134A. When the touch input force is no longer applied to the blade 204, the magnetic attraction between the pivot 126A and the mounting interface 202 may return the paddle accessory 128A from the actuation posture to the default posture. In some implementations, auxiliary springs and/or other biasing devices may be used to increase a return force applied to the paddle accessory 128A.

Figure 12:
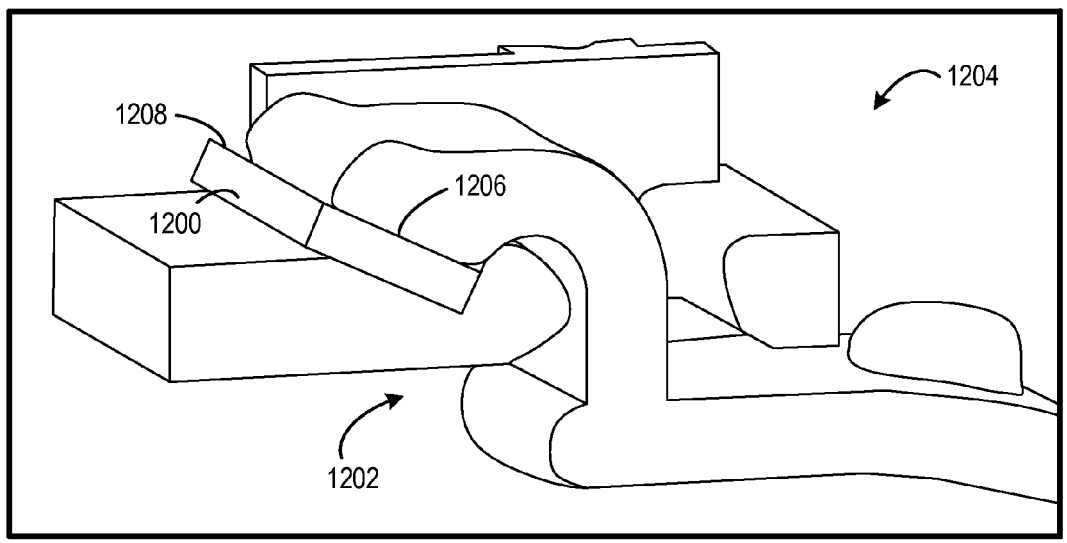
FIG. 12 shows another example pivot including a magnet.

FIG. 12 shows another example pivot 1200 configured to magnetically affix a paddle accessory 1202 to a game controller 1204. The paddle accessory 1202 may include a mounting interface 1206 that is made of ferromagnetic material magnetically attracted to the pivot 1200. The pivot 1200 may be oriented in the game controller 1204 such that a retention interface 1208 of the pivot 1200 is oriented at approximately a forty-five degree angle. Likewise, the mounting interface 1206 may be shaped to have an angle that cooperates with the angle of the retention interface 1208 to affix the paddle accessory 1202 flush with the pivot 1200. Such a configuration differs from the pivot 126A and the mounting interface 202 which has a vertical retention interface. The slanted orientation of the retention interface 1208 may adjust a range of angular rotation of the paddle accessory 1202 towards the game controller 1204. A pivot may be oriented at any suitable angle relative to the game controller to removably affix a paddle accessory to the game controller.

Figure 13:
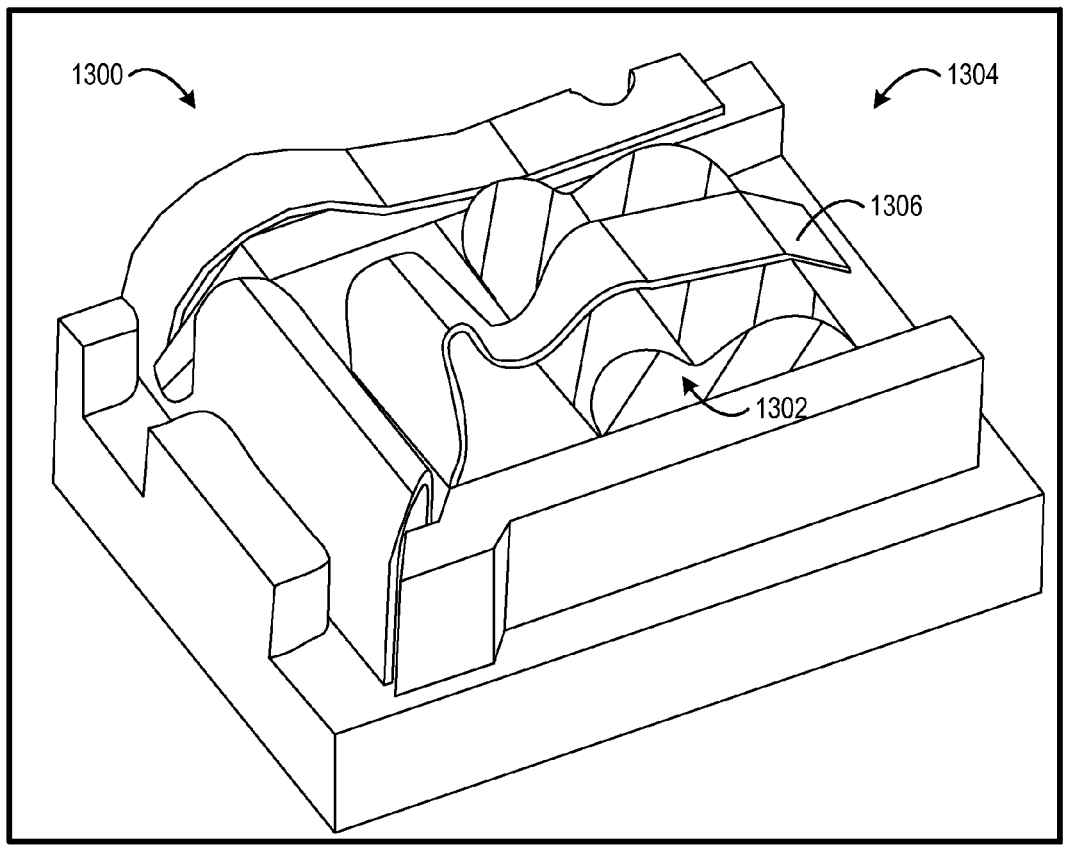
FIG. 13 shows another example pivot including a spring-biased hook.
Figure 14:
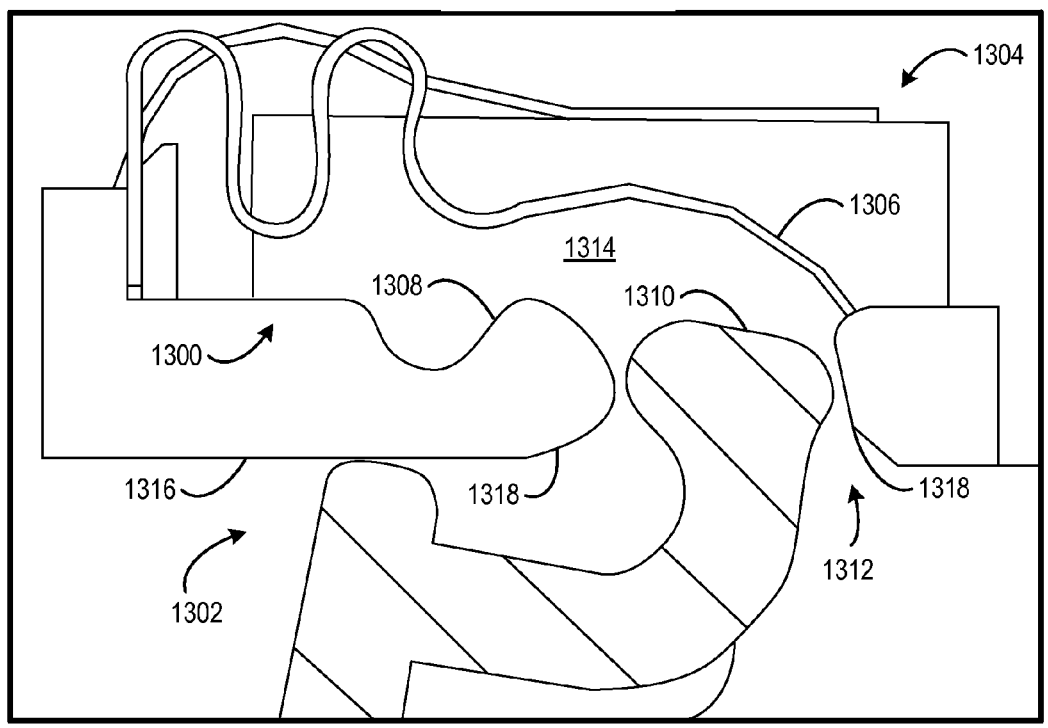
FIGS. 14-15 show an example approach for removably affixing a paddle accessory to the pivot of FIG. 13.
Figure 15:
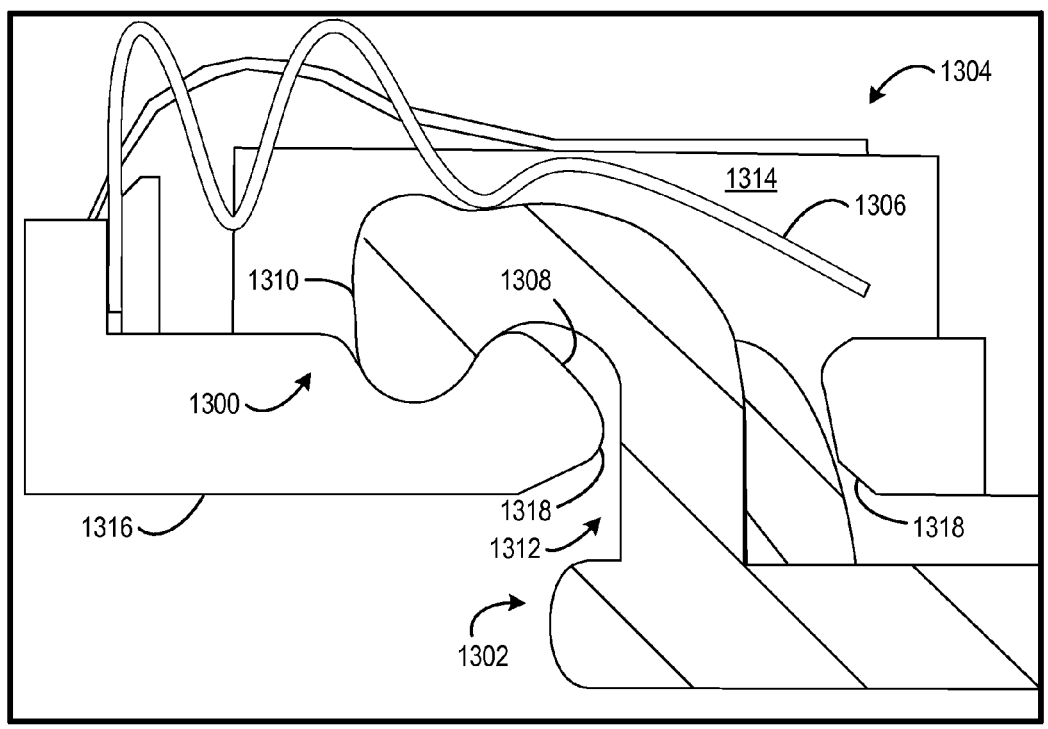

FIGS. 13-15 show another example pivot 1300 configured to removably affix a paddle accessory 1302 to a game controller 1304. The pivot 1300 comprises a spring-biased hook that includes a spring 1306 and a hook 1308 (shown in FIGS. 14-15). The spring 1306 may be positioned and biased to span a pivot aperture 1312 defined by a pivot rim 1318 located on a grip 1316 when no paddle accessory is affixed to the spring-biased hook 1300. In FIG. 14, the paddle accessory 1302 is oriented in a first position to allow a mounting interface 1310 to be inserted into the pivot aperture 1312. The mounting interface 1310 may be pushed into an interior cavity 1314 of the game controller 1304 suitably far enough to interact with the spring 1306. In particular, the mounting interface 1310 may be inserted with enough force to overcome a spring force of the spring 1306 and bend the spring 1306 away from the pivot aperture 1312 far enough to allow the mounting interface 1310 to clear the hook 1308. Once the mounting interface 1310 has cleared the hook 1308, the paddle accessory 1302 may be rotated (e.g., approximately ninety degrees) from the first position to a second position where the hook 1308 mates with the mounting interface 1310.

In FIG. 15, the paddle accessory 1302 is oriented in the second position where the mounting interface 1310 mates with the hook 1308. Moreover, the spring 1306 is biased to apply the spring force to the paddle accessory 1302 to pinch the paddle accessory 1302 against the grip 1316 and removably affix the paddle accessory 1302 to the game controller 1304.

The pivot 1300 may have a low profile within the interior cavity. The pivot 1300 may be installed on the grip 1316 without adhesive. Since the pivot 1300 does not affix the paddle accessory 1302 via a magnetic attraction, the paddle accessory 1302 need not include ferromagnetic material.

Figure 16:
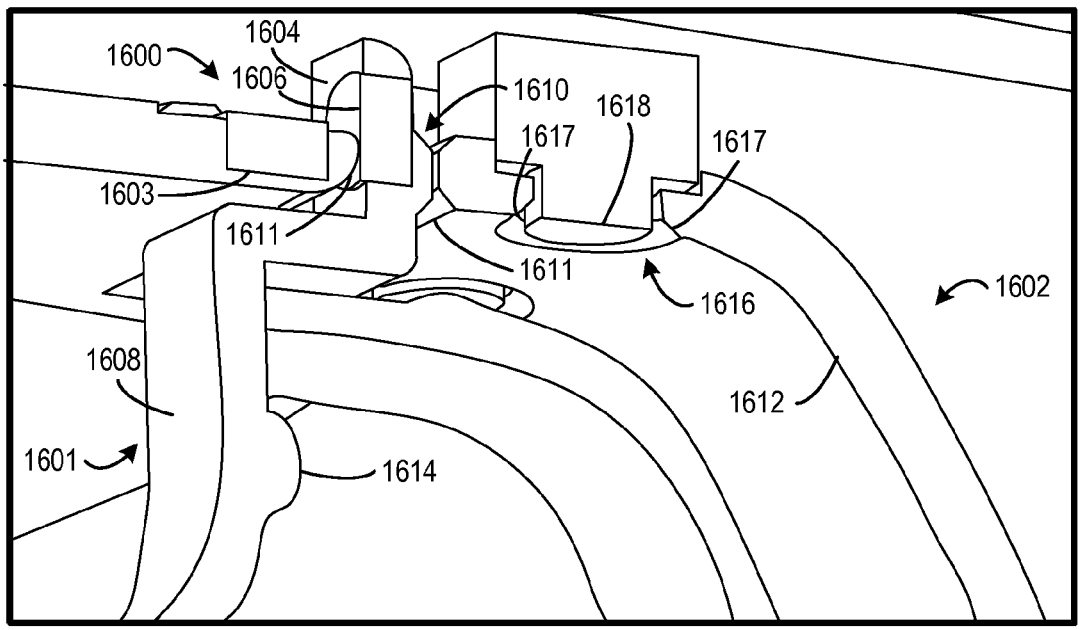
FIGS. 16-17 show another example paddle accessory including a magnet.
Figure 17:
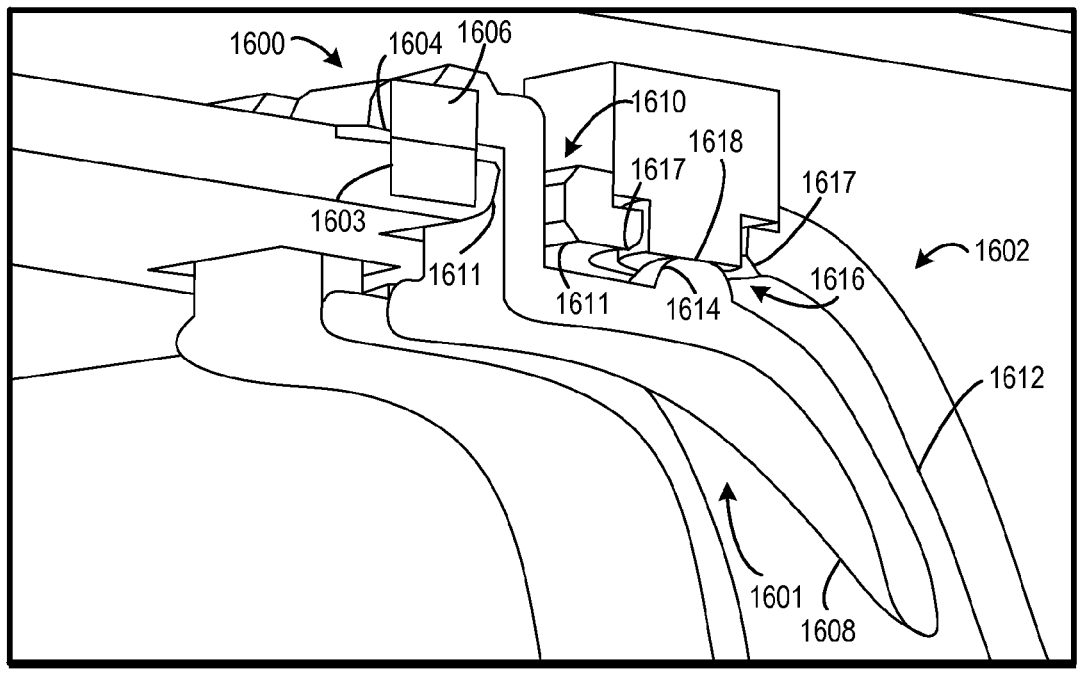

FIGS. 16-17 show another example pivot 1600 including a magnet 1603 configured to removably affix a paddle accessory 1601 to a game controller 1602. In particular, the paddle accessory 1601 has a mounting interface 1604 that includes a magnet 1606 that is magnetically attracted to the magnet 1603. The magnet 1606 may be coupled to a blade 1608 of the paddle accessory 1601. By employing the magnet 1606 in the paddle accessory 1601, the blade 1608 need not be made of ferromagnetic material. For example, the blade 1608 instead may be injected-molded plastic.

In FIG. 16, the paddle accessory 1601 is oriented in a first position to allow the mounting interface 1604 to be inserted into a pivot aperture 1610 defined by a pivot rim 1611 located on a grip 1612 of the game controller 1602. In the first position, the blade 1608 may be askew relative to the grip 1612. The paddle accessory 1601 may be inserted through the pivot aperture 1610 far enough for the mounting interface 1604 to clear the pivot 1600. Once the mounting interface 1604 has cleared the pivot 1600, the paddle accessory 1601 may be rotated (e.g., approximately ninety degrees) from the first position to a second position where the magnet 1606 mates with the magnet 1603 to magnetically affix the paddle accessory 1601 to the game controller 1602.

In FIG. 17, the paddle accessory 1601 is oriented in the second position with the magnet 1606 mated flush with the magnet 1603, and the blade 1608 is aligned to follow the contour of the grip 1612. Further, a sensor-actuation feature 1614 extends into a sensor aperture 1616 defined by a sensor rim 1617 located on the grip 1612 to interface with a paddle-actuatable sensor 1618. Note that the same approach may be performed in reverse order to remove the paddle accessory 128A from the game controller 100.

Figure 18:
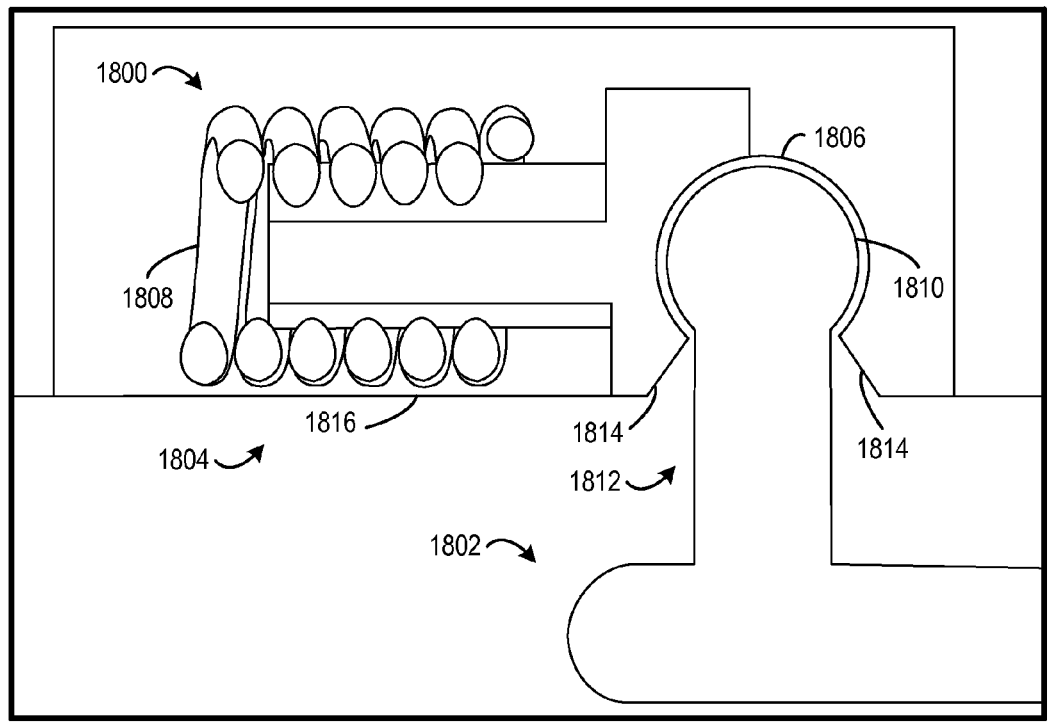
FIG. 18 shows another example pivot including a spring-biased hinge.

FIG. 18 shows another example pivot 1800 configured to removably affix a paddle accessory 1802 to a game controller 1804. The pivot 1800 includes a socket 1806 and a spring 1808. The socket 1806 may be accessible through a pivot aperture 1812 defined by a pivot rim 1814 located on a grip 1816 of the game controller 1804. In particular, the paddle accessory 1802 includes a mounting interface 1810 having a rounded head configured to mate with the socket 1806. In one example, the rounded head may be cylindrical and the socket 1806 may be a C-clamp. The mounting interface 1810 may be initially inserted into the socket 1806 with enough force to overcome a spring force of the spring 1808. In other words, the spring 1808 may be pushed aside to allow the mounting interface 1810 to enter the socket 1806. Further, when the mounting interface 1810 is fully inserted into the socket 1806, the spring 1808 may apply a spring force to the mounting interface 1810 to affix the paddle accessory 1802 to the game controller 1804. The rounded mounting interface 1810 and the socket 1806 may collectively form a hinge about which the paddle accessory 1802 may rotate.

In other such implementations, the spring 1808 may be replaced by another fastener. For example, such fastener may include a snap, an elastic member, temporarily deformable resilient material (e.g., foam or rubber), or another type of fastener.

Figure 19:
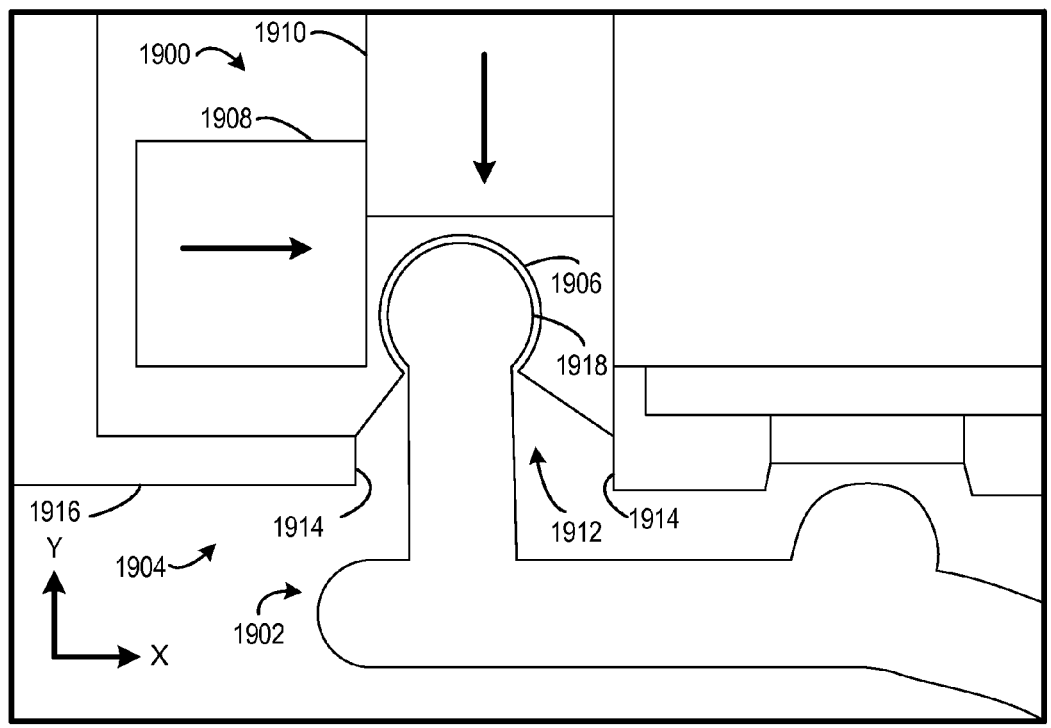
FIG. 19 shows another example pivot including a magnetic hinge.

FIG. 19 shows another example pivot 1900 configured to removably affix a paddle accessory 1902 to a game controller 1904. The pivot 1900 includes a socket 1906, a first magnet 1908, and a second magnet 1910. The first magnet 1908 may be positioned to generate a magnetic field in the X direction, and the second magnet 1910 may be positioned to generate a magnetic field in the Y direction. The socket 1906 may be accessible through a pivot aperture 1912 defined by a pivot rim 1914 located on a grip 1916 of the game controller 1904. The socket 1906 may be sized or otherwise configured to accommodate a mounting interface 1918 of the paddle accessory 1902. The mounting interface 1918 may have a rounded head configured to mate with the socket 1906. In one example, the rounded head may be cylindrical and the socket 1906 may be a C-clamp. In one example, the socket 1906 may be configured to be temporarily deformable responsive to insertion of the mounting interface 1918 with an insertion force great enough to temporarily deform the socket 1906.

Further, the mounting interface 1918 may be made at least partially of ferromagnetic material that is magnetically attracted to the first magnet 1908 and the second magnet 1910. In particular, when the mounting interface 1918 is inserted into the socket 1906, the first and second magnets 1908 and 1910 generate a collective magnetic field that affixes the paddle accessory 1902 to the game controller 1904. The rounded mounting interface 1918 and the socket 1906 may collectively form a hinge about which the paddle accessory 1902 may rotate.

In other such implementations, the first magnet 1908 and the second magnet 1910 may be placed in other orientations. For example, one or more of the magnets may be orientated such that the pole of the one or more magnets may be substantially perpendicular to a central axis of a cylinder of the mounting interface 1918.

In other such implementations, the magnets and the ferromagnetic material may be swapped. For example, the first magnet 1908 and the second magnet 1910 alternatively may be made of ferromagnetic material, and the mounting interface 1918 may include a magnet that is magnetically attracted to the ferromagnetic material.

In the implementation illustrated in FIG. 19, the mounting interface 1918 of the paddle accessory 1912 may be inserted into the pivot aperture 1912 a selected distance in the Y direction in order to interface with the socket 1906 to affix the paddle accessory 1902 to the game controller 1904. In other such implementations, the pivot 1900 may be configured such that once the paddle accessory 1902 is inserted in the pivot aperture 1912, the paddle accessory 1902 may be shifted in the X direction (e.g., at a diagonal angle) in order to insert the mounting interface 1918 into the socket 1906. Once the mounting interface 1918 is secured in the socket 1906, the paddle accessory 1902 may be rotated ninety degrees to align the activation feature with the paddle actuatable sensor.

Figure 20:
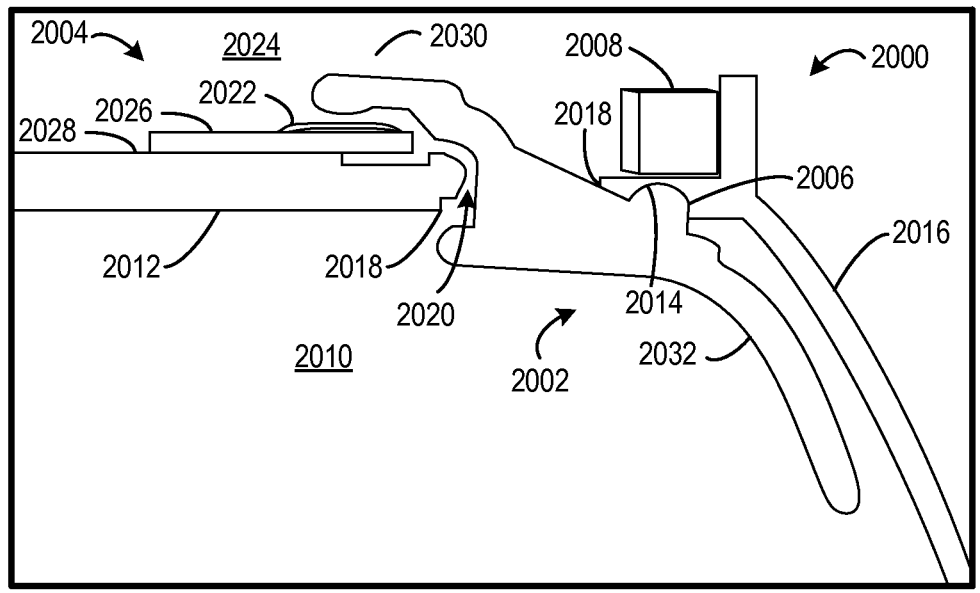
FIGS. 20-21 shown another example paddle accessory and pivot configuration.
Figure 21:
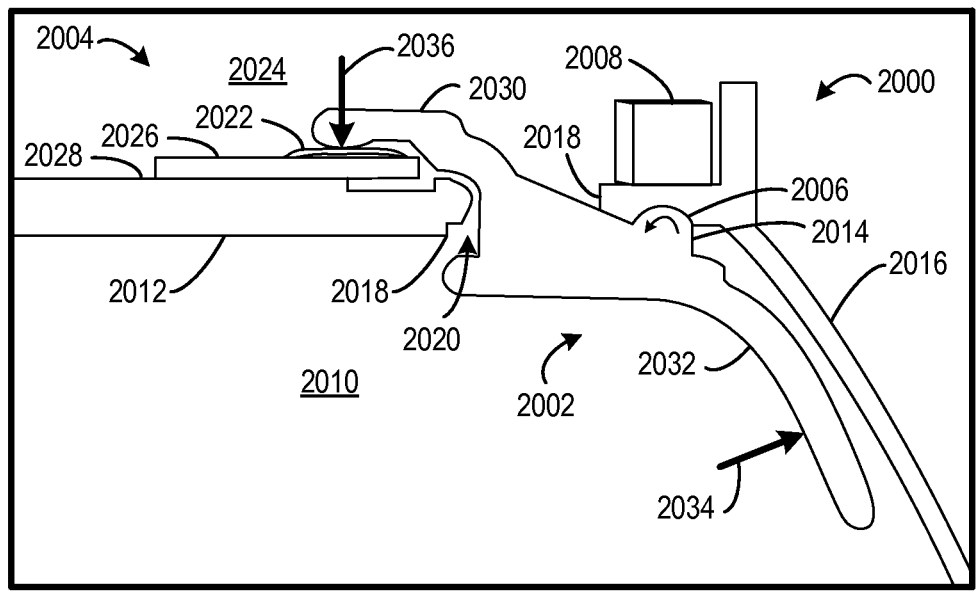

FIGS. 20-21 show another example pivot 2000 configured to removably affix a paddle accessory 2002 to a game controller 2004. The pivot 2000 includes a socket 2006 and a magnet 2008. In particular, the socket 2006 may be positioned at an exterior 2010 of a grip 2012. Further, the grip 2012 includes a hand portion 2016 (e.g., corresponding to the left-hand portion 102 or the right-hand portion 104 of the game controller 100) configured to be gripped by a hand. A rim 2018 located on the grip 2012 defines a sensor aperture 2020. A paddle-actuatable sensor 2022 may be positioned in an interior cavity 2024 of the grip 2012 such that the paddle-actuatable sensor 2022 is accessible through the sensor aperture 2020. In particular, the paddle-actuatable sensor 2022 may be located on a printed circuit board 2026 that is coupled to an interior side 2028 of the grip 2012. The sensor aperture 2020 may be spaced apart from the pivot 2000 such that the pivot 2000 is positioned closer to the hand portion 2016 than the paddle-actuatable sensor.

The paddle accessory 2002 includes a blade 2032. A rounded mounting interface 2014 and a sensor-activation feature 2030 extend from the blade 2032. To removably affix the paddle accessory 2002 to the game controller 2004, the sensor-activation feature 2030 may be inserted through the sensor aperture 2020, and the paddle accessory 2002 may be inserted far enough into the interior cavity 2024 for the sensor-activation feature 2030 to clear the paddle-actuatable sensor 2022. Once the sensor-activation feature 2030 has cleared the paddle-actuatable sensor 2022, the paddle accessory 2002 may be rotated such that the rounded mounting interface 2014 mates with the socket 2006. The rounded mounting interface 2014 may be made at least partially of ferromagnetic material that is magnetically attracted to the magnet 2008. Such a magnetic attraction may affix the rounded mounting interface 2014 to the socket 2006. The rounded mounting interface 2014 and the socket 2006 may collectively form a hinge about which the paddle accessory 2002 may rotate.

In FIG. 20, the paddle accessory 2002 is in a default posture in which no touch force is applied to the blade 2032. In the default posture, the sensor-activation feature 2030 is spaced apart from the paddle-actuatable sensor 2022. In some implementations, the sensor-activation feature 2030 may touch the paddle-actuatable sensor 2022, but without applying enough force to cause the paddle-actuatable sensor 2022 to actuate. The magnetic attraction between the magnet 2008 and the rounded mounting interface 2014 may maintain the paddle accessory 2002 in the default pressure when no touch force is applied to the paddle accessory 2002.

In FIG. 21, the paddle accessory 2002 is rotated to an actuation posture responsive to a touch input force 2034 being applied to the blade 2032. In the actuation posture, the mounting interface 2014 rotates relative to the socket 2006. Further, in the actuation posture, the sensor-activation feature 2030 rotates to apply an actuation force 2036 to the paddle-actuatable sensor 2022. The actuation force 2036 may be sufficient to actuate the paddle-actuatable sensor 2022. When the touch input force 2034 is no longer applied to the blade 204, the magnetic attraction between the magnet 2008 and the rounded mounting interface 2014 may return the paddle accessory 2002 from the actuation posture to the default posture.

In some implementations, a rim of the pivot aperture and/or other surfaces of the game controller configured to interact with the paddle accessory may include a low-friction material that allows the paddle accessory to slide into the pivot aperture and/or allows the paddle accessory to affix to the pivot. For example, the rim around the pivot aperture may include a polished surface that differs from a texture of an exterior surface of the game controller that may have a higher-friction surface configured to be gripped by a hand.

In other implementations, the game controller may include a mounting platform configured to rigidly, removably affix a paddle accessory to the game controller. In other words, the mounting platform may not allow the paddle accessory to pivot responsive to a touch force being applied to the paddle accessory. Rather, the paddle accessory may be configured to flex or deform responsive to a touch force being applied to the paddle accessory to interact with a paddle-actuatable sensor.

Figure 22:
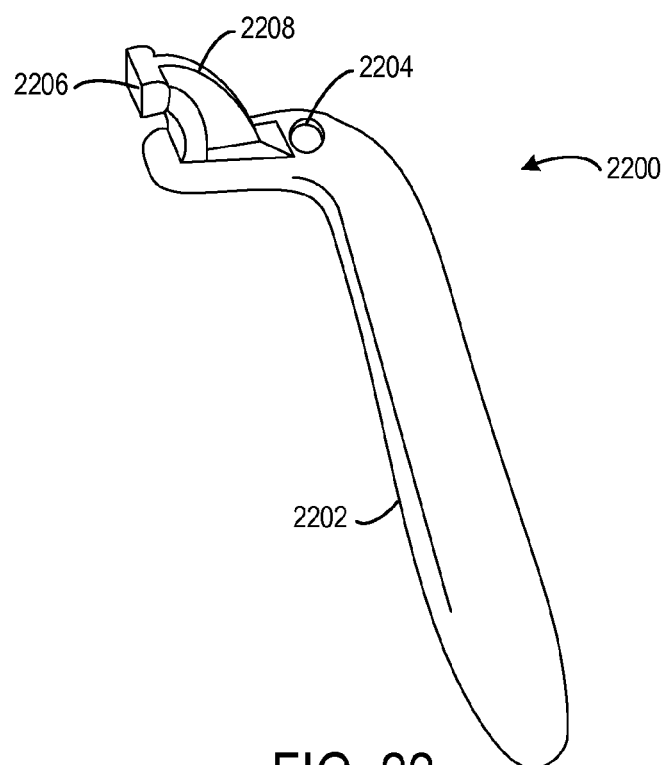
FIG. 22 shows an example paddle accessory.

FIG. 22 shows an example paddle accessory 2200 configured to be removably affixed to a game controller having a paddle-actuatable sensor that is positioned closer to a hand portion than a pivot, such as the game controller 100 shown in FIG. 1. The paddle accessory 2200 includes a blade 2202 sized and shaped for manual manipulation by a finger. The blade 2202 may be curved to follow a contour of a hand portion of the game controller.

A sensor-activation feature 2204, herein depicted as a projection, extends from the blade 2202 and may be configured to selectively interact with a paddle-actuatable sensor recessed within a sensor aperture of the game controller. In particular, the projection may be configured to extend into the sensor aperture of the game controller to interface with the paddle-actuatable sensor when the paddle accessory 2200 rotates responsive to user input.

A mounting interface 2206 may be spaced apart from the sensor-activation feature 2204 along the blade 2202. In particular, when the paddle accessory 2200 is removably affixed to a game controller, the sensor-activation feature 2204 may be positioned closer to a hand portion of the game controller than the mounting interface 2206. The mounting interface 2206 may be configured to selectively mate with a pivot of the game controller to removably affix the paddle accessory 2200 to the game controller. In particular, the mounting interface 2206 may be made at least partially of ferromagnetic material configured to magnetically affix the paddle accessory 2200 to a pivot of the game controller. The paddle accessory 2200 may be configured to rotate relative to the pivot to translate a touch force applied to the blade 2202 into an actuation force applied by the sensor-activation feature 2204 to the paddle-actuatable sensor interior the aperture of the game controller.

A stabilization fin 2208 may be positioned between the sensor-activation feature 2204 and the mounting interface 2206. The stabilization fin 2208 may be configured to extend into a mating slot of the game controller. The mating slot may be sized to prevent the stabilization fin 2208 from rotating about an axis different than an axis of rotation of the mounting interface 2206 relative to the pivot of the game controller. In other words, interaction of the stabilization fin 2208 with the mating slot of the game controller may prevent the paddle accessory 2200 from twisting when being depressed by a finger of a user.

Figure 23:
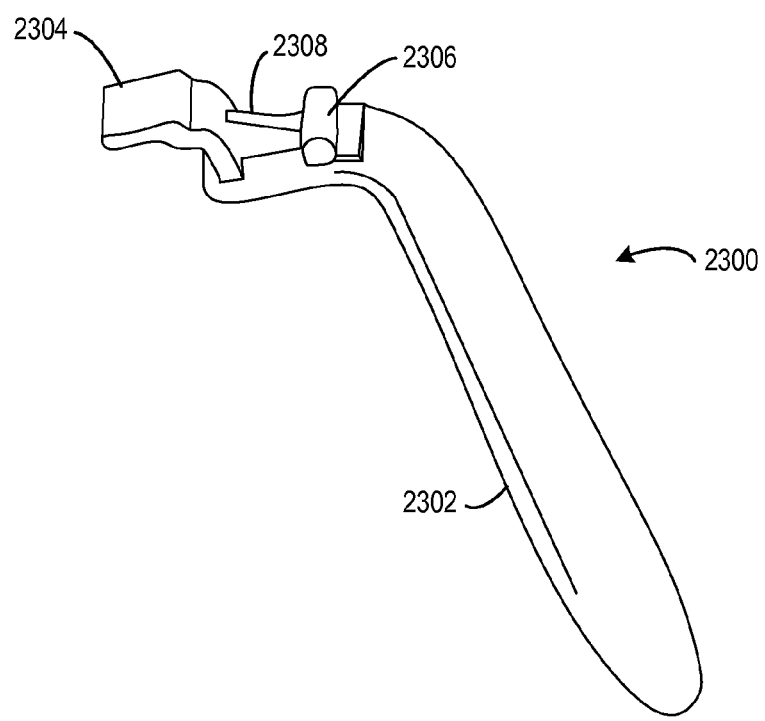
FIG. 23 shows another example paddle accessory.

FIG. 23 shows an example paddle accessory 2300 configured to be removably affixed to a game controller having a pivot that is positioned closer to a hand portion than a paddle-actuatable sensor, such as the game controller 2004 shown in FIG. 20. The paddle accessory 2300 includes a blade 2302 sized and shaped for manual manipulation by a finger. The blade 2302 may be curved to follow a contour of a hand portion of the game controller.

A sensor-activation feature 2304, herein depicted as a ledge, extends from the blade 2302 and may be configured to selectively interact with a paddle-actuatable sensor of the game controller. In particular, the ledge may be configured to be inserted into a sensor aperture and rotated to be position over the paddle-actuatable sensor.

A mounting interface 2306 may be spaced apart from the sensor-activation feature 2304 along the blade 2302. In particular, when the paddle accessory 2300 is removably affixed to a game controller, the mounting interface 2306 may be positioned closer to a hand portion of the game controller than the sensor-activation feature 2304. The mounting interface 2306 may be configured to selectively mate with a pivot of the game controller to removably affix the paddle accessory 2300 to the game controller. In particular, the mounting interface 2306 may be made at least partially of ferromagnetic material configured to magnetically affix the paddle accessory 2300 to a pivot of the game controller. Further, the mounting interface 2306 may be rounded to selectively mate with a socket formed by the pivot. In such a configuration, the rounded mounting interface 2306 and the socket may collectively form a hinge about which the paddle accessory 2300 rotates relative to the pivot to translate a touch force applied to the blade 2302 into an actuation force applied by the sensor-activation feature 2304 to the paddle-actuatable sensor interior the aperture of the game controller.

A stabilization fin 2308 may be positioned between the sensor-activation feature 2304 and the mounting interface 2306. The stabilization fin 2308 may be configured to extend into a mating slot of the game controller. The mating slot may be sized to prevent the stabilization fin 2308 from rotating about an axis different than an axis of rotation of the mounting interface 2306 relative to the pivot of the game controller. In other words, interaction of the stabilization fin 2308 with the mating slot of the game controller may prevent the paddle accessory 2300 from twisting when being depressed by a finger of a user.

Different paddle accessories may be configured differently to provide different gameplay experiences. For example, different paddle accessories may have blades of different dimensions including different lengths, widths, and curvatures. In some implementations, a blade may include one or more bends and/or one or more twists relative to the portion of the paddle accessory on which the mounting interface and/or the sensor-activation feature are located. For example, a blade may bend at 25°, 45°, 60°, 90°, 120°, or at another angle. In another example, a blade may be twisted upwards toward the triggers or downwards toward the directional pad. For example, a blade may be twisted at 25°, 45°, 60°, 90°, 120°, or at another angle. In another example, a blade may include a combination of one or more bends and one or more twists.

As another example, different paddle accessories may have blades having different cross-sectional shapes including circular or elliptical shapes, angular shapes including shapes having squared-off corners, and other suitable shapes. As another example, different paddles may have blades having different degrees of convexity or concavity. As another example, different paddle accessories may have different textures including smooth textures, rough textures, or other suitable textures. Some textures may be formed from different material coatings applied to the blade. Other textures may be formed by a structure of the blade itself.

In another example implementation, a paddle accessory for a game controller comprises a blade sized and shaped for manual manipulation by a finger, a sensor-activation feature extending from the blade, and a mounting interface spaced apart from the sensor-activation feature. The mounting interface may be configured to selectively mate with a pivot of the game controller to removably affix the paddle accessory to the game controller. The paddle accessory may be configured to rotate relative to the pivot to translate a touch force applied to the blade into an actuation force applied by the sensor-activation feature to a paddle-actuatable sensor interior an aperture of the game controller. In one example implementation that optionally may be combined with any of the features described herein, the mounting interface is positioned between the sensor-activation feature and the blade. In one example implementation that optionally may be combined with any of the features described herein, the sensor-activation feature is positioned between the mounting interface and the blade. In one example implementation that optionally may be combined with any of the features described herein, the blade is curved to follow a contour of a hand portion of the game controller that is configured to be gripped by a hand. In one example implementation that optionally may be combined with any of the features described herein, the mounting interface includes a magnet configured to magnetically affix the paddle accessory to a magnet of the pivot. In one example implementation that optionally may be combined with any of the features described herein, the mounting interface is made at least partially of ferromagnetic material to magnetically affix the paddle accessory to a magnet of the pivot. In one example implementation that optionally may be combined with any of the features described herein, the mounting interface includes a rounded head configured to mate with a socket of the pivot to collectively form a hinge. In one example implementation that optionally may be combined with any of the features described herein, the sensor-activation feature includes a projection configured to extend into an aperture of the game controller to apply the actuation force to the paddle-actuatable sensor responsive to the touch force being applied to the blade. In one example implementation that optionally may be combined with any of the features described herein, the paddle accessory comprises a stabilization fin positioned between the sensor-activation feature and the mounting interface. The stabilization fin may be configured to extend into a mating slot of the game controller. In one example implementation that optionally may be combined with any of the features described herein, the stabilization fin extends a first depth into the mating slot when no touch force is applied to the blade. The stabilization fin extends a second depth into the mating slot responsive to the touch force being applied to the blade. The second depth may be greater than the first depth.

In another example implementation, a paddle accessory for a game controller comprises a blade sized and shaped for manual manipulation by a finger, a sensor-activation feature extending from the blade, and a mounting interface spaced apart from the sensor-activation feature. The mounting interface may be made at least partially of ferromagnetic material to magnetically affix the paddle accessory to a magnetic pivot of the game controller. The paddle accessory may be configured to rotate relative to the magnetic pivot to translate a touch force applied to the blade into an actuation force applied by the sensor-activation feature to a paddle-actuatable sensor interior an aperture of the game controller. In one example implementation that optionally may be combined with any of the features described herein, the mounting interface is positioned between the sensor-activation feature and the blade. In one example implementation that optionally may be combined with any of the features described herein, the sensor-activation feature is positioned between the mounting interface and the blade. In one example implementation that optionally may be combined with any of the features described herein, the blade is curved to follow a contour of a hand portion of the game controller that is configured to be gripped by a hand. In one example implementation that optionally may be combined with any of the features described herein, the mounting interface includes a rounded head configured to mate with a socket of the pivot to collectively form a hinge. In one example implementation that optionally may be combined with any of the features described herein, the sensor-activation feature includes a projection configured to extend into an aperture of the game controller to apply the actuation force to the paddle-actuatable sensor responsive to the touch force being applied to the blade. In one example implementation that optionally may be combined with any of the features described herein, the paddle accessory comprises a stabilization fin positioned between the sensor-activation feature and the mounting interface, the stabilization fin configured to extend into a mating slot of the game controller.

In another example implementation, a paddle accessory for a game controller comprises a blade curved to follow a contour of a hand portion of the game controller that is configured to be gripped by a hand, the blade being sized and shaped for manual manipulation by a finger, a sensor-activation feature extending from the blade, a mounting interface spaced apart from the sensor-activation feature, and a stabilization fin positioned between the sensor-activation feature and the mounting interface. The mounting interface may be configured to selectively mate with a pivot of the game controller to removably affix the paddle accessory to the game controller. The paddle accessory may be configured to rotate relative to the pivot to translate a touch force applied into the blade to an actuation force applied by the sensor-activation feature to the paddle-actuatable sensor. The stabilization fin may be configured to extend into a mating slot of the game controller. In one example implementation that optionally may be combined with any of the features described herein, the stabilization fin extends a first depth into the mating slot when no touch force is applied to the blade. The stabilization fin extends a second depth into the mating slot responsive to the touch force being applied to the blade, the second depth being greater than the first depth. In one example implementation that optionally may be combined with any of the features described herein, the mounting interface is made at least partially of ferromagnetic material to magnetically affix the paddle accessory to a magnet of the pivot.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A paddle accessory for a game controller, the paddle accessory comprising:
   a blade sized and shaped for manual manipulation by a finger;
   a sensor-activation feature extending from the blade; and
   a mounting interface spaced apart from the sensor-activation feature, the mounting interface being configured to selectively mate with a pivot of the game controller to removably affix the paddle accessory to the game controller, the paddle accessory being configured to rotate relative to the pivot to translate a touch force applied to the blade into an actuation force applied by the sensor-activation feature to a paddle-actuatable sensor interior an aperture of the game controller.

2. The paddle accessory of claim 1, wherein the mounting interface is positioned between the sensor-activation feature and the blade.

3. The paddle accessory of claim 1, wherein the sensor-activation feature is positioned between the mounting interface and the blade.

4. The paddle accessory of claim 1, wherein the blade is curved to follow a contour of a hand portion of the game controller that is configured to be gripped by a hand.

5. The paddle accessory of claim 1, wherein the mounting interface includes a magnet configured to magnetically affix the paddle accessory to a magnet of the pivot.

6. The paddle accessory of claim 1, wherein the mounting interface is made at least partially of ferromagnetic material to magnetically affix the paddle accessory to a magnet of the pivot.

7. The paddle accessory of claim 1, wherein the mounting interface includes a rounded head configured to mate with a socket of the pivot to collectively form a hinge.

8. The paddle accessory of claim 1, wherein the sensor-activation feature includes a projection configured to extend into an aperture of the game controller to apply the actuation force to the paddle-actuatable sensor responsive to the touch force being applied to the blade.

9. The paddle accessory of claim 1, further comprising:
   a stabilization fin positioned between the sensor-activation feature and the mounting interface, the stabilization fin configured to extend into a mating slot of the game controller.

10. The paddle accessory of claim 9, wherein the stabilization fin extends a first depth into the mating slot when no touch force is applied to the blade, and wherein the stabilization fin extends a second depth into the mating slot responsive to the touch force being applied to the blade, the second depth being greater than the first depth.

11. A paddle accessory for a game controller, the paddle accessory comprising:
   a blade sized and shaped for manual manipulation by a finger;
   a sensor-activation feature extending from the blade; and
   a mounting interface spaced apart from the sensor-activation feature, the mounting interface being made at least partially of ferromagnetic material to magnetically affix the paddle accessory to a magnetic pivot of the game controller, the paddle accessory being configured to rotate relative to the magnetic pivot to translate a touch force applied to the blade into an actuation force applied by the sensor-activation feature to a paddle-actuatable sensor interior an aperture of the game controller.

12. The paddle accessory of claim 11, wherein the mounting interface is positioned between the sensor-activation feature and the blade.

13. The paddle accessory of claim 11, wherein the sensor-activation feature is positioned between the mounting interface and the blade.

14. The paddle accessory of claim 11, wherein the blade is curved to follow a contour of a hand portion of the game controller that is configured to be gripped by a hand.

15. The paddle accessory of claim 11, wherein the mounting interface includes a rounded head configured to mate with a socket of the pivot to collectively form a hinge.

16. The paddle accessory of claim 11, wherein the sensor-activation feature includes a projection configured to extend into an aperture of the game controller to apply the actuation force to the paddle-actuatable sensor responsive to the touch force being applied to the blade.

17. The paddle accessory of claim 11, further comprising:
   a stabilization fin positioned between the sensor-activation feature and the mounting interface, the stabilization fin configured to extend into a mating slot of the game controller.

18. A paddle accessory for a game controller, the paddle accessory comprising:
   a blade curved to follow a contour of a hand portion of the game controller that is configured to be gripped by a hand, the blade being sized and shaped for manual manipulation by a finger;
   a sensor-activation feature extending from the blade;
   a mounting interface spaced apart from the sensor-activation feature, the mounting interface being configured to selectively mate with a pivot of the game controller to removably affix the paddle accessory to the game controller, the paddle accessory being configured to rotate relative to the pivot to translate a touch force applied into the blade to an actuation force applied by the sensor-activation feature to a paddle-actuatable sensor of the game controller; and
   a stabilization fin positioned between the sensor-activation feature and the mounting interface, the stabilization fin configured to extend into a mating slot of the game controller.

19. The paddle accessory of claim 18, wherein the stabilization fin extends a first depth into the mating slot when no touch force is applied to the blade, and wherein the stabilization fin extends a second depth into the mating slot responsive to the touch force being applied to the blade, the second depth being greater than the first depth.

20. The paddle accessory of claim 18, wherein the mounting interface is made at least partially of ferromagnetic material to magnetically affix the paddle accessory to a magnet of the pivot.

* * * * *